(12) United States Patent
Matsunaga et al.

(10) Patent No.: US 7,601,778 B2
(45) Date of Patent: Oct. 13, 2009

(54) AQUEOUS DISPERSION INCLUDING TWO DIFFERENT BLOCK COPOLYMERS

(75) Inventors: Shuji Matsunaga, Ibaraki (JP); Mototsugu Yoshihara, Chiba (JP); Yukio Itoshima, Ibaraki (JP); Mamoru Omoda, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 118 days.

(21) Appl. No.: 10/546,436

(22) PCT Filed: Feb. 20, 2004

(86) PCT No.: PCT/JP2004/001991

§ 371 (c)(1),
(2), (4) Date: Jun. 26, 2006

(87) PCT Pub. No.: WO2004/074374

PCT Pub. Date: Sep. 2, 2004

(65) Prior Publication Data

US 2007/0015863 A1    Jan. 18, 2007

(30) Foreign Application Priority Data

Feb. 21, 2003  (JP)  ............................. 2003-044573

(51) Int. Cl.
  *C08L 53/00*  (2006.01)
  *C08L 53/02*  (2006.01)
(52) U.S. Cl. ........................................ 524/505; 525/89
(58) Field of Classification Search ................... 525/89; 524/505
  See application file for complete search history.

(56) References Cited

U.S. PATENT DOCUMENTS

| 5,104,921 | A | * | 4/1992 | Erickson et al. | ............. | 524/274 |
| 5,292,795 | A |   | 3/1994 | Southwick et al. | | |
| 5,985,979 | A | * | 11/1999 | Southwick et al. | ........... | 524/505 |
| 6,486,229 | B1 | * | 11/2002 | Hu et al. | ........................ | 522/80 |
| 2005/0228114 | A1 | * | 10/2005 | Gelles | ........................ | 524/502 |

FOREIGN PATENT DOCUMENTS

| EP | 1 162 233 | 12/2001 |
|---|---|---|
| JP | 06 049315 | 2/1994 |
| JP | 2000-007860 | 1/2000 |
| JP | 2001-026695 | 1/2001 |
| JP | 2001-098140 | 4/2001 |
| JP | 2001-288372 | 10/2001 |
| JP | 2002-080685 | 3/2002 |
| JP | 2002-80687 | 3/2002 |
| JP | 2002-226590 | 8/2002 |
| JP | 2002-294020 | 10/2002 |

\* cited by examiner

*Primary Examiner*—Jeffrey C Mullis
(74) *Attorney, Agent, or Firm*—Oblon, Spivak, McClelland, Maier & Neustadt, L.L.P.

(57) ABSTRACT

The aqueous dispersion of the present invention is produced by incorporating a block copolymer (II) into an aqueous dispersion (I) of a block copolymer (I) in an aqueous solution containing a basic compound. The block copolymer (I) is composed of a polymer block (A) mainly constituted by a constitutional unit derived from an olefin monomer and a polymer block (B) constituted by a constitutional unit derived from a vinyl monomer (b1) having a carboxyl group, a carboxylic anhydride group or a sulfonic group and a constitutional unit derived from another vinyl monomer (b2) copolymerizable with the vinyl monomer (b1). The content of the basic component is 0.05 equiv or more of the carboxyl group, carboxylic anhydride group or sulfonic group, each contained in the unit derived from the vinyl monomer (b1). The block copolymer (II) is composed of a polymer block (X) mainly constituted by a constitutional unit derived from an aromatic vinyl monomer and a polymer block (Y) constituted by a constitutional unit derived from a conjugated diene monomer. The aqueous dispersion provides a flexible coating film which is excellent in bonding and adhesion properties to various substrates.

21 Claims, No Drawings

AQUEOUS DISPERSION INCLUDING TWO DIFFERENT BLOCK COPOLYMERS

TECHNICAL FIELD

The present invention relates to aqueous dispersions, and more particularly to aqueous dispersions containing at least two different kinds of block copolymers, which are improved in the bonding and adhesion properties to various substrates.

BACKGROUND ART

Polyolefin resins such as polypropylene have been widely used as plastics for home appliances and automobile parts because of their low costs and excellent resin properties such as processability, water resistance and oil resistance. To enhance their additional values, a coating layer is formed on the surface of polyolefin molded articles, or polyolefin and another resin are made into laminates. However, since polyolefin has a low polarity, the adhesion of general paints or other resins to polyolefin is poor.

To solve this problem, it has been hitherto attempted to increase the surface polarity of polyolefin molded articles so as to improve the adhesion to paints or other resins by treating the surface in advance with chromic acid, fire flame, corona discharge, plasma, solvent, etc. However, these treatments have problems of needing complicated procedures and being dangerous because of the use of a large amount of corrosive chemicals.

Under these circumstances, there has been proposed a method in which the surface of polyolefin molded articles is coated with a primer mainly made of a chlorinated polyolefin. However, since the chlorinated polyolefin should be dissolved in an aromatic organic solvent harmful to human body, such as toluene and xylene, the method causes safety and environmental problems. To solve the problems, there has been proposed a method to make the chlorinated polyolefin water-dispersible (JP 1-256556A and JP 4-218548A). However, this method also fails to completely eliminate the use of the aromatic organic solvents, and the obtained coating film is poor in weatherability and water resistance. Moreover, it has been demanded to develop an aqueous dispersion adhesive free from chlorine in view of preventing the generation of hydrogen chloride gas upon waste incineration and a good recycling capability.

DISCLOSURE OF THE INVENTION

The inventors had made extensive study on aqueous dispersions which provided coating films excellent in the bonding and adhesion properties to various substrates, storage stability, water resistance, weatherability, etc. As a result, the inventors had found an aqueous dispersion meeting the above requirements, which was an aqueous dispersion of a block copolymer in an aqueous solution of a basic compound, wherein the block copolymer is composed of a polymer block (A) mainly constituted by a constitutional unit derived from olefin monomer and a polymer block (B) constituted by from 2 to 100 mol % of a constitutional unit derived from a vinyl monomer having a carboxyl group or a carboxylic anhydride group and from 98 to 0 mol % of a constitutional unit derived from another vinyl monomer copolymerizable with the above vinyl monomer, and wherein the content of the basic compound is 0.05 equiv or more of the carboxyl group or carboxylic anhydride group, each contained in the unit derived from the vinyl monomer. On the basis of this finding, the inventors filed a patent application (U.S. Pat. No. 6,451,901).

Thus, an object of the present invention is to further improve the properties of the above aqueous dispersion and to provide an aqueous dispersion capable of forming a flexible coating film which is excellent in the bonding and adhesion properties to various substrates.

The inventors filed a patent application on an aqueous dispersion which was prepared by blending the aqueous dispersion of U.S. Pat. No. 6,451,901 with at least one component selected from the group consisting of (i) a polyurethane resin, (ii) an acrylic aqueous emulsion adhesive, a vinyl acetate aqueous emulsion adhesive, a styrene aqueous emulsion adhesive, or an aqueous dispersion or an aqueous solution of a vinyl polymer such as polyvinyl alcohol, and (iii) a tackifier such as saturated petroleum resins (EP 1172407A). The inventors further filed a patent application on an aqueous dispersion which was prepared by blending the aqueous dispersion of U.S. Pat. No. 6,451,901 with (iv) a compound (curing agent) having in one molecule two or more functional groups, such as epoxy group, oxazoline group, carbodiimide group and isocyanate group, which were reactive with carboxyl group (JP 2002-80685A). The bonding and adhesion properties to various substrates of the aqueous dispersion of U.S. Pat. No. 6,451,901 were improved by these aqueous dispersions.

The inventors have further continued the study of the improvement in the properties of the aqueous dispersion of U.S. Pat. No. 6,451,901. As a result, it has been found that the flexibility of a coating film formed from an aqueous dispersion is improved without adversely affecting the bonding and adhesion properties to various substrates by adding a component other than the components (i) to (iv) to the aqueous dispersion. After further examination based on this finding, the present invention has been accomplished.

Thus, the present invention provides an aqueous dispersion which is produced by incorporating a block copolymer (II) into an aqueous dispersion (I) of a block copolymer (I) in an aqueous solution containing a basic compound, wherein the block copolymer (I) is composed of a polymer block (A) mainly constituted by a constitutional unit derived from an olefin monomer and a polymer block (B) constituted by a constitutional unit derived from a vinyl monomer having a carboxyl group, a carboxylic anhydride group or a sulfonic group and a constitutional unit derived from another vinyl monomer copolymerizable with the vinyl monomer; wherein a content of the basic compound is 0.05 equiv or more of the carboxyl group, carboxylic anhydride group or sulfonic group, each contained in the unit derived from the vinyl monomer; and wherein the block copolymer (II) is composed of a polymer block (X) mainly constituted by a constitutional unit derived from an aromatic vinyl monomer and a polymer block (Y) constituted by a constitutional unit derived from a conjugated diene monomer.

PREFERRED EMBODIMENTS FOR CARRYING OUT THE INVENTION

The block copolymer (I) is composed of the polymer block (A) and the polymer block (B) each described below. The block copolymer (I) may include, for example, AB diblock copolymers, ABA triblock copolymers, and BAB triblock copolymers, with AB block copolymers being preferred.

The polymer block (A) is mainly constituted by a constitutional unit derived from an olefin monomer. The content of the olefin monomer unit in the polymer block (A) is preferably from 50 to 100 mol %, more preferably from 70 to 100 mol % and still more preferably from 80 to 100 mol % and most preferably 100 mol % based on the total molar number of the constitutional units of the polymer block (A).

Examples of the constitutional unit derived from the olefin monomer include units derived from ethylene; α-olefins such as propylene, 1-butene, 2-methyl-1-butene, 3-methyl-1-butene, 1-pentene, 4-methyl-1-pentene, 1-hexene, 1-octene, 1-decene and 1-octadecene; 2-butene; isobutylene; conjugated dienes such as butadiene and isoprene; vinylcyclohexane; cyclopentadiene; and β-pinene. The polymer block (A) may contain one or more kinds of these units. The polymer block (A) preferably contains a constitutional unit derived from ethylene or propylene. More preferred blocks are a polymer block constituted by a constitutional unit derived from propylene; a copolymer block constituted by a constitutional unit derived from propylene and a constitutional unit derived from ethylene; a copolymer block constituted by a constitutional unit derived from propylene and a constitutional unit derived from α-olefin other than propylene; a polymer block constituted by a constitutional unit derived from ethylene; and a copolymer block constituted by a constitutional unit derived from ethylene and a constitutional unit derived from α-olefin other than propylene. If the olefin monomer unit is derived from a conjugated diene such as butadiene, isoprene and cyclopentadiene, the remaining unsaturated bond may be hydrogenated.

The polymer block (A) may optionally contain a constitutional unit derived from a vinyl monomer copolymerizable with the olefin monomer in an amount of from 0 to 50 mol %, preferably from 0 to 30 mol % and more preferably from 0 to 20 mol %. Examples of the vinyl monomer copolymerizable with the olefin monomer include (meth)acrylonitrile; vinyl esters such as vinyl acetate and vinyl pivalate; (meth)acrylic esters such as methyl(meth)acrylate, ethyl(meth)acrylate, butyl(meth)acrylate, dodecyl(meth)acrylate and 2-ethylhexyl(meth)acrylate; (meth)acrylamide; and N-vinyl-2-pyrrolidone. These monomers may be used alone or in combination of two or more. Preferred are methyl acrylate, ethyl acrylate and acrylonitrile.

The polymer block (B) contains a constitutional unit derived from the vinyl monomer (b1) having a carboxyl group, a carboxylic anhydride group or a sulfonic group in an amount of from 2 to 100 mol % based on the total molar number of the constitutional units of the polymer block (B). To enhance the water resistance of the coating films formed from the aqueous dispersion, the content of the constitutional unit derived from the vinyl monomer (b1) is preferably from 2 to 45 mol % and more preferably from 2 to 30 mol % based on the total molar number of the constitutional units of the polymer block (B).

Examples of the vinyl monomer (b1) having a carboxyl group include acrylic acid, methacrylic acid, crotonic acid, cinnamic acid, itaconic acid and maleic acid. These may be used alone or in combination of two or more. Preferred are acrylic acid and methacrylic acid. The carboxyl group may be in the salt form of metal such as sodium and potassium.

Examples of the vinyl monomer (b1) having a carboxylic anhydride group (—CO—O—CO—) include maleic anhydride, itaconic anhydride, citraconic anhydride, butenyl succinic anhydride and tetrahydrophthalic anhydride. These may be used alone or in combination of two or more. Preferred is maleic anhydride.

Examples of the vinyl monomer (b1) having a sulfonic group include 4-styrenesulfonic acid, 2-methyl-2-propene-1-sulfonic acid, allylsulfonic acid and 2-acrylamido-2-methylpropanesulfonic acid. These may be used alone or in combination of two or more. The sulfonic group may be in the salt form of metal such as sodium and potassium.

The polymer block (B) may contain a constitutional unit derived from another vinyl monomer (b2) copolymerizable with the vinyl monomer (b1) in an amount of from 0 to 98 mol %, preferably from 55 to 98 mol % and more preferably from 70 to 98 mol % based on the total molar number of the constitutional units of the polymer block (B).

Examples of the vinyl monomer (b2) include styrenic monomers such as styrene, 4-methylstyrene and vinylnaphthalene; (meth)acrylonitrile; vinyl esters such as vinyl acetate and vinyl pivalate; (meth)acrylic esters such as methyl(meth)acrylate, ethyl(meth)acrylate, butyl(meth)acrylate, dodecyl(meth)acrylate, 2-ethylhexyl(meth)acrylate, tetrahydrofurfuryl(meth)acrylate and tetrahydropyran-2-methyl(meth)acrylate; (meth)acrylamide; and N-vinyl-2-pyrrolidone. These may be used alone or in combination of two or more. Preferred are methyl(meth)acrylate, ethyl(meth)acrylate, tetrahydrofurfuryl (meth)acrylate, styrene and acrylonitrile.

The number-average molecular weight of the polymer block (A) is preferably from 500 to 100,000 and more preferably from 1,000 to 20,000. The number-average molecular weight of the polymer block (B) is preferably from 500 to 100,000 and more preferably from 1,000 to 20,000. The number-average molecular weight of the block copolymer (I) is preferably from 1,000 to 200,000 and more preferably from 2,000 to 40,000.

The number-average molecular weight referred to herein was determined by a gel permeation chromatography (GPC) using a standard polystyrene calibration curve.

The weight ratio of the polymer block (A) to the polymer block (B) in the block copolymer (I) (polymer block (A)/polymer block (B)) is preferably from 4/1 to 1/4 and more preferably from 2/1 to 1/2.

The block copolymer (I) is produced, for example, by radical-polymerizing the monomer component for constituting the polymer block (B) in the presence of a mercapto-terminated polymer having a structure corresponding to that of the polymer block (A). By such a method, the block copolymer (I) having a desired number-average molecular weight and a desired molecular weight distribution is easily and efficiently produced.

The mercapto-terminated polymer having a structure corresponding to that of the polymer block (A) is produced by various methods, for example, by a method where an addition product of a double bond-terminated olefin polymer with thio-S-acetic acid, thio-S-benzoic acid, thio-S-propionic acid, thio-S-butyric acid or thio-S-valeric acid is treated with an acid or alkali, or a method where a polyolefin is produced by anionic polymerization using ethylene sulfide as a polymerization terminator.

If an olefin polymer is added in an amount of from 1 to 200 parts by weight per 100 parts by weight of the block copolymer (I), the strength of the coating film formed from the resultant aqueous dispersion is enhanced in some cases. In view of the balance between the storage stability of the aqueous dispersion and the strength of the coating film, the amount of the olefin polymer to be added is preferably from 1 to 100 parts by weight and more preferably 1 to 50 parts by weight per 100 parts by weight of the block copolymer (I). If the addition amount of the olefin polymer exceeds 200 parts by weight, the average particle size of dispersed particles becomes large to reduce the storage stability of the resultant aqueous dispersion.

Examples of the olefin polymer include low-density polyethylenes, medium-density polyethylenes, high-density polyethylenes, very low-density polyethylenes, linear low-density polyethylenes, polypropylene, ethylene-vinyl acetate copolymers, ethylene-ethyl acrylate copolymers, ethylene-methyl acrylate copolymers, propylene-α-olefin copolymers, ethylene-α-olefin copolymers and ethylene-propylene-diene (or triene) tercopolymers. These may be used alone or in combination of two or more. Examples of the α-olefin for the ethylene-α-olefin copolymers include propylene, 1-butene, 1-pentene, 1-hexene, 4-methyl-1-pentene, 1-octene and 1-decene. Examples of the diene or triene for the ethylene-propylene-diene (or triene) tercopolymers include aliphatic non-conjugated dienes such as 1,4-hexadiene, 1,6-octadiene, 2-methyl-1,5-hexadiene, 6-methyl-1,6-heptadiene and 7-methyl-1,6-octadiene; alicyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,5-norbornadiene, 1,3,7-octatriene and 1,4,9-decatriene. These olefin polymers may be modified by known methods, for example, by a halogenation such as chlorination and bromination; chlorosulfonation; epoxidation; hydroxylation; anhydrous carboxylation; and carboxylation.

The aqueous dispersion (I) can be produced by dispersing the block copolymer (I) and the optional olefin polymer into an aqueous solution containing a basic compound in an amount of 0.05 equiv or more of the carboxyl group, carboxylic anhydride group or sulfonic group of the polymer block (B) at a temperature not lower than the melting point of the block copolymer (I). If the optional olefin polymer is used, the dispersion is preferably conducted at a temperature not lower than the higher melting point of the block copolymer (I) and the optional olefin polymer. If dispersed at a temperature lower than the higher melting point, the average particle size of dispersed particles becomes large to lower the stability of the aqueous dispersion (I).

The dispersion may be performed using a pressure container equipped with a stirring means. Preferred examples of stirring means include, but not limited to, turbine-type stirrer, colloid mill, homomixer, and homogenizer, because a large shear force is obtained. Alternatively, the dispersion may be performed using a line mixer equipped with a movable stirrer or a line mixer equipped with a non-movable stirrer such as "Static Mixer" (tradename of Noritake Co., Ltd.).

Examples of the basic compound include ammonia; amine compounds such as hydroxylamine, hydrazine, hydrazine hydrate, methylamine, ethylamine, propylamine, butylamine, hexylamine, octylamine, ethanolamine, propanolamine, dimethylamine, diethylamine, dipropylamine, dibutylamine, dihexylamine, dioctylamine, diethanolamine, dipropanolamine, trimethylamine, triethylamine, tripropylamine, tributylamine, trihexylamine, trioctylamine, triethanolamine, tripropanolamine, N-methyldiethanolamine, N,N-dimethylethanolamine, N,N-diethylethanolamine, 2-dimethylamino-2-methyl-1-propanol, 2-amino-2-methyl-1-propanol and cyclohexylamine; quaternary ammonium salts such as tetramethylammonium hydroxide and tetrabutylammonium hydroxide; metal oxides such as sodium oxide, potassium oxide, calcium oxide, strontium oxide and barium oxide; metal hydroxides such as barium hydroxide, sodium hydroxide, potassium hydroxide, calcium hydroxide and strontium hydroxide; carbonates such as sodium carbonate, potassium carbonate, sodium hydrogencarbonate, potassium hydrogencarbonate and calcium hydrogencarbonate; and acetic acid salts such as sodium acetate, potassium acetate and calcium acetate, with ammonia, methylamine, ethylamine, propylamine, butylamine, dimethylamine, diethylamine, dipropylamine, dibutylamine, N-methyldiethanolamine, triethylamine, N,N-dimethylethanolamine, N,N-diethylethanolamine, 2-dimethylamino-2-methyl-1-propanol, 2-amino-2-methyl-1-propanol, sodium hydroxide and potassium hydroxide being preferred, and ammonia, sodium hydroxide and potassium hydroxide being more preferred, in view of easy availability and the stability of the aqueous dispersion. These basic compounds may be used alone or in combination of two or more.

The amount of the basic compound to be used is 0.05 equiv or more of the carboxyl group, carboxylic anhydride group or sulfonic group in the polymer block (B) of the block copolymer (I), and is preferably from 0.2 to 5 equiv and more preferably from 0.3 to 1.5 equiv in view of making the particle size of dispersed particles more finer. One equivalent of the basic compound per one mole of the carboxyl group or sulfonic group corresponds to one mole of the basic compound, whereas corresponds to two moles of the basic compound for the carboxylic anhydride group.

These basic compounds are preferably used in the form of aqueous solution.

The proportion of the block copolymer (I) and the aqueous solution of the basic compound in the aqueous dispersion (I) is preferably 95 to 30 parts by weight of the aqueous solution of the basic compound based on 5 to 70 parts by weight of the block copolymer (I).

The block copolymer (II) is composed of the polymer block (X) mainly constituted by a constitutional unit derived from an aromatic vinyl compound (hereinafter may be referred to merely as "X") and the polymer block (Y) constituted by a constitutional unit derived from a conjugated diene (hereinafter may be referred to merely as "Y"). The polymer block (X) and the polymer block (Y) may be bonded in any of linear configuration, branched configuration, radial configuration, and combinations thereof, with the bonding in linear configuration being preferred.

The block copolymer (II) may have a block structure represented by the formula:

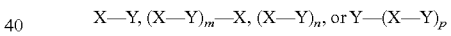

$$X—Y, (X—Y)_m—X, (X—Y)_n, \text{ or } Y—(X—Y)_p$$

wherein m, n and p are each an integer of one or more. Block copolymers in which the polymer block (X) and the polymer block (Y) are linearly bonded are preferred, with diblock copolymers of the formula X—Y and triblock copolymers of the formula X—Y—X being more preferred, and triblock copolymers of the formula X—Y—X being still more preferred.

When the block copolymer (II) contains two or more polymer blocks (X), the structures of these polymer blocks (X) may be the same or different. Also, when the block copolymer (II) contains two or more polymer blocks (Y), the structures of these polymer blocks (Y) may be the same or different. For example, two polymer blocks (X) in the triblock structure of the formula X—Y—X, or two polymer blocks (Y) in the triblock structure of the formula Y—X—Y may be the same or different in the kinds of aromatic vinyl compound and conjugated diene, the bonding configuration, the number-average molecular weight, etc.

Examples of the aromatic vinyl compound for constituting the polymer block (X) include styrene, α-methylstyrene, o-methylstyrene, m-methylstyrene, p-methylstyrene, 2,4-dimethylstyrene, 2,4,6-trimethylstyrene, vinylnaphthalene, vinylanthracene, 4-propylstyrene, 4-cyclohexylstyrene, 4-dodecylstyrene, 2-ethyl-4-benzylstyrene, 4-(phenylbutyl)styrene, t-butylstyrene, indene, acetonaphthylene, monofluorostyrene, difluorostyrene, monochlorostyrene and methoxystyrene. These may be used alone or in combination of two or more. Preferred are styrene and α-methylstyrene.

The polymer block (X) may be composed of, in addition to the constitutional unit derived from the aromatic vinyl compound, a constitutional unit derived from another copolymerizable monomer, if required. The content of the constitutional unit derived from another copolymerizable monomer is preferably 30% by weight or lower (inclusive of zero) and more preferably 10% by weight or lower (inclusive of zero) of the weight of the polymer block (X). Examples of such another copolymerizable monomer include 1-butene, pentene, hexene, butadiene, 2-methyl-1,3-butadiene (isoprene) and methyl vinyl ether.

Examples of the conjugated diene for constituting the polymer block (Y) include 1,3-butadiene, isoprene, 2,3-dimethyl-1,3-butadiene, 1,3-pentadiene and 1,3-hexadiene. These may be use alone or in combination of two or more. Preferred are isoprene, butadiene and a mixture thereof, with isoprene and a mixture of isoprene and butadiene being more preferred. When the polymer block (Y) contains constitutional units derived from two or more kinds of conjugated dienes, these constitutional units may be bonded in any configuration of random, taper, partial block, or a combination thereof.

The polymer block (Y) may be hydrogenated. The degree of hydrogenation is preferably 50 mol % or more (inclusive of 100 mol %) and more preferably 70 mol % or more (inclusive of 100 mol %), because the aqueous dispersion capable of forming a coating film excellent in heat resistance and weatherability is obtained.

The content of 1,2-bond and 3,4-bond in the polymer block (Y) is preferably 30 mol % or more (inclusive of 100 mol %). When the polymer block (Y) is an isoprene polymer block which may be hydrogenated, or an isoprene-butadiene copolymer block which may be hydrogenated, the content of 1,2-bond and 3,4-bond in the polymer block (Y) is more preferably 40 mol % or more (inclusive of 100 mol %). When the polymer block (Y) is a butadiene polymer block which may be hydrogenated, the content of 1,2-bond in the polymer block is more preferably 60 mol % or more (inclusive of 100 mol %).

The content of the constitutional unit derived from the aromatic vinyl compound is preferably from 5 to 70% by weight and more preferably from 10 to 60% by weight based on the weight of whole constitutional units of the block copolymer (II). By the use of the block copolymer (II) having a content of the constitutional unit derived from the aromatic vinyl compound within the above range, the coating film formed from the aqueous dispersion is excellent in the balance between flexibility and strength.

The number-average molecular weight of the polymer block (X) is preferably from 2,500 to 100,000, and the number-average molecular weight of the polymer block (Y) is preferably from 10,000 to 200,000. The number-average molecular weight of the block copolymer (II) is preferably from 20,000 to 300,000 and more preferably from 30,000 to 150,000, although not limited thereto.

The block copolymer (II) may have a functional group such as hydroxyl group, epoxy group, halogen atom and amino group at the molecular end or in the molecular chain, and a carboxyl group at the molecular end. The polymer block (Y) may have a carboxyl group or an acid anhydride group.

The block copolymer (II) is produced, for example but not limited to, by a method where the aromatic vinyl compound and the conjugated diene are successively polymerized in an inert organic solvent such as n-hexane and cyclohexane using an alkyllithium compound as a polymerization initiator optionally in the presence of tetrahydrofuran or tetramethylethylenediamine, and the polymerization is terminated by the addition of an active hydrogen-containing compound such as alcohols at the time when the the desired molecular structure and molecular weight are attained. The block copolymer thus produced is preferably hydrogenated in an inert solvent such as n-hexane and cyclohexane at 20 to 150° C. under a hydrogen pressure of 0.1 to 15 MPa in the presence of a hydrogenation catalyst such as Ziegler catalyst made of an alkylaluminum compound with cobalt, nickel, etc. Block copolymers (II) commercially available are also usable.

The method of incorporating the block copolymer (II) into the aqueous dispersion of the block copolymer (I) is not limited. The aqueous dispersion of the present invention is produced, for example, by adding an aqueous dispersion of the block copolymer (II) to an aqueous dispersion of the block copolymer (I), or by dispersing the block copolymer (I) simultaneously with the block copolymer (II) into an aqueous medium.

The aqueous dispersion of the block copolymer (II) is produced, for example, by dissolving the block copolymer (II) in an organic solvent, dispersing the resultant solution in water containing a surfactant under stirring, and then removing the organic solvent.

The organic solvents usable are those capable of dissolving the block copolymer (II). Examples thereof include aliphatic hydrocarbons such as pentane, hexane and octane; alicyclic hydrocarbons such as cyclohexane; and aromatic hydrocarbons such as benzene, toluene and xylene. These may be used alone or in combination of two or more. Preferred are alicyclic hydrocarbons and aromatic hydrocarbons, with cyclohexane, toluene and xylene being more preferred.

The surfactant may be anionic, cationic or nonionic, and selected according to its purpose of use. The amount of the surfactant to be used is usually from 0.1 to 40 parts by weight per 100 parts by weight of the block copolymer (II), with a minimum amount required being preferred.

Examples of the anionic surfactant include salts of higher fatty acids, salts of higher secondary fatty acids, sulfuric ester salts of higher primary alcohols, sulfuric ester salts of higher secondary alcohols, salts of higher primary alkylsulfonic acids, salts of higher secondary alkylsulfonic acids, salts of higher alkyldisulfonic acids, salts of sulfonated higher fatty acids, sulfuric ester salts of higher fatty acids, salts of higher fatty ester sulfonic acids, sulfuric ester salts of higher alcohol ethers, sulfonic salts of higher alcohol ethers, alkylolsulfuric ester salts of higher fatty amides, salts of alkylbenzensulfonic acids, salts of alkylphenolsulfonic acids, salts of alkylnaphthalenesulfonic acids, salts of alkylbenzoimidazolesulfonic acids, salts of alkylphosphoric acids, salts of alkyletherphosphoric acids, and salts of alkylallyletherphosphoric acids.

Examples of the cationic surfactant include amine salt types and quaternary ammonium salt types.

Examples of the nonionic surfactant include polyethylene glycol nonionic surfactants and polyhydric alcohol nonionic surfactants. Examples of the polyethylene glycol nonionic surfactants include adducts of higher alcohols with ethyleneoxide, adducts of alkylphenols with ethyleneoxide, adducts of fatty acids with ethyleneoxide, adducts of polyhydric alcohol fatty acid esters with ethyleneoxide, adducts of higher alkylamines with ethyleneoxide, adducts of fatty acid amides with ethyleneoxide, adducts of fats and oils with ethyleneoxide and adducts of polypropylene glycol with ethyleneoxide. Examples of the polyhydric alcohol nonionic surfactants include glycerol fatty acid esters, pentaerythritol fatty acid esters, sorbitol fatty acid esters, sorbitan fatty acid esters, sucrose fatty acid esters, polyhydric alcohol alkyl ethers and fatty acid amides of alkanolamines. These may be used alone or in combination of two or more.

The organic solvent solution of the block copolymer (II) can be dispersed into water by using a container equipped with a mixing means. Examples of the mixing means include, but not limited to, turbine-type stirrer, colloid mill, homomixer, homogenizer and extruder because a high shear force is obtained. Alternatively, the dispersion may be performed using a line mixer equipped with a movable stirrer or a line mixer equipped with a non-movable stirrer such as "Static Mixer" (tradename of Noritake Co., Ltd.).

After dispersing the organic solvent solution of the block copolymer (II) into water, the organic solvent can be azeotropically removed with water, for example, using a reactor with a stirrer and a condenser, a vented extruder, or a rotary evaporator. The removal of the organic solvent is performed either under atmospheric pressure or under reduced pressure.

In the aqueous dispersion of the present invention, the weight ratio of the block copolymer (II) and the block copolymer (I) is preferably from 10:90 to 90:10 and more preferably from 20:80 to 80:20.

The aqueous dispersion of the present invention may further contain a crosslinking agent. The crosslinking agent usable in the present invention is a water-soluble or water-dispersible compound having in one molecule two or more functional groups reactive with the carboxyl group, acid hydride group or sulfonic group in the block copolymer (I). Examples of such functional groups include an epoxy group, an aziridine group, an oxazoline group, a carbodiimide group and an isocyanate group.

Preferred as the crosslinking agent are epoxy compounds, with polyfunctional epoxy compounds having an epoxy equivalent (weight per one equivalent of epoxy group) of from 50 to 2,500 being more preferred, and polyfunctional epoxy compounds having an epoxy equivalent of from 100 to 1,000 being still more preferred. The molecular weight of the polyfunctional epoxy compounds is preferably from 150 to 5,000 and more preferably from 200 to 3,000.

Examples of the epoxy compound include sorbitol polyglycidyl ether, sorbitan polyglycidyl ether, polyglycerol polyglycidyl ether, pentaerythritol polyglycidyl ether, diglycerol polyglycidyl ether, triglycidyl-tris(2-hydroxyethyl) isocyanurate, glycerol polyglycidyl ether, trimethylolpropane polyglycidyl ether, resorcin diglycidyl ether, neopentyl glycol diglycidyl ether, 1,6-hexanediol diglycidyl ether, polyethylene glycol diglycidyl ether, polypropylene glycol diglycidyl ether, polytetramethylene glycol diglycidyl ether, allyl glycidyl ether, 2-ethylhexyl glycidyl ether, phenyl glycidyl ether, phenol(ethyleneoxide)glycidyl ether, p-t-butylphenyl glycidyl ether, lauryl alcohol(ethyleneoxide)glycidyl ether, diglycidyl adipate, glycidyl o-phthalate, hydroquinone diglycidyl ether, bisphenol A diglycidyl ether, bisphenol S diglycidyl ether, diglycidyl terephthalate, glycidylphthalimide, dibromophenyl glycidyl ether and dibromoneopentyl glycol diglycidyl ether, with ethylene glycol diglycidyl ether, polyethylene glycol diglycidyl ether and bisphenol A diglycidyl ether being preferred because their aqueous dispersions are easily prepared.

These epoxy compounds are easily available in the form of aqueous dispersions, for example, commercially available as trademanes of "Denacol" and "Denacast" each from Nagase Chemicals, Ltd. and "Epolsion" from Kanebo NSC, Ltd. The aqueous solution of water-soluble epoxy compounds can be easily prepared without using commercial products.

Examples of the crosslinking agent other than the polyfunctional epoxy compounds include polyfunctional aziridine compounds such as "PZ-33" (tradename; manufactured by Nippon Shokubai Co., Ltd.); polyfunctional oxazoline compounds such as "WS-500" and "K-2030E" (tradenames, each manufactured by Nippon Shokubai Co., Ltd.); polyfunctional carbodiimide compounds such as "Carbodilite E-01" and "Carbodilite V-02" (tradenames; each manufactured by Nissinbo Industries, Inc.; and polyfunctional isocyanate compounds such as "CR-60N" (tradename; manufactured by Dainippon Ink & Chemicals, Inc., and "Takelac WD" (tradename; manufactured by Takeda Pharmaceutical Company Limited).

The amount of the crosslinking agent to be used is preferably from 0.2 to 20% by weight of the total weight of the block copolymer (I) and the block copolymer (II).

The aqueous dispersion of the present invention may also contain a tackifier in an amount not adversely affecting the effects of the invention, preferably from 0.1 to 100% by weight of the total weight of the block copolymer (I) and the block copolymer (II). The tackifier has been widely used in the technical fields of adhesive tapes, paints, hot melt adhesives, etc. Examples thereof include petroleum resins such as $C_4$-, $C_5$-, or $C_9$-petroleum resins and $C_4$ to $C_9$-copolymerized petroleum resins; saturated petroleum resins prepared by the hydrogenation of the petroleum resins; rosin derivatives such as rosins, polymeric rosins, hydrogenated rosins, esters of rosins with glycerol or pentaerythritol, and resin acid dimers; terpene-based resins such as terpene resins polymerized with $\alpha,\beta$-pinene, terpene phenol resins, aromatic modified terpene resins and hydrogenated terpene resins; coumarone-indene resins; phenol resins; xylene resins; and styrene resins. The tackifiers generally have a number-average molecular weight of from 500 to 3,000 and a softening point of from 50 to 140° C. Preferred are the saturated petroleum resins, terpene-based resins and rosin derivatives because the bonding and adhesion properties to substrates of the aqueous dispersions are further improved in some cases. Commercially available saturated petroleum resins are usable, which include, for example, "Regalrez" and "Regalite" (each manufactured by Rika Hercules, Ltd.), "Arkon" (manufactured by Arakawa Chemical Industries, Ltd.), "Escorez" (manufactured by Tonex Co., Ltd.), "Quintone" (manufactured by Zeon Corporation), and "Imarv" (manufactured by Idemitsu Petrochemical Co., Ltd.). Examples of aqueous emulsion-type tackifiers include "Super Ester" and "Tamanol" (each manufactured by Arakawa Chemical Industries, Ltd.).

Further, the aqueous dispersion may contain polyurethane or vinyl polymer. Examples of polyurethanes include (a) an aqueous dispersion of polyurethane resin which is produced by reacting an organic polyisocyanate, a polymer polyol and a carboxyl-containing polyol into a carboxyl-containing, isocyanate-terminated prepolymer, and then polymerizing the prepolymer in the presence of a chain extender such as polyamines simultaneously with or after the step of emulsifying the prepolymer in water by the aid of neutralization with a tertiary amine, etc.; (b) an aqueous dispersion of polyurethane resin which is produced by reacting an organic polyisocyanate and a polymer polyol into an isocyanate-terminated prepolymer, and then polymerizing the prepolymer in the presence of a chain extender such as polyamines simultaneously with or after the step of emulsifying the prepolymer in water by the aid of a surfactant; (c) an aqueous dispersion of polyurethane resin which is produced by reacting an organic polyisocyanate, a polymer polyol, a carboxyl-containing polyol and a chain extender into a carboxyl-containing polyurethane, and then emulsifying the polyurethane in water by the aid of neutralization with a tertiary amine, etc.; (d) an aqueous dispersion of polyurethane composite resin which is produced by emulsion-polymerizing a vinyl monomer in the aqueous dispersion of polyurethane resin described in (a) to (c); and (e) an aqueous solution or an aqueous dispersion of polyurethane resin which is produced by reacting an organic polyisocyanate, a polymer polyol including a polyoxyalkylene glycol and a chain extender into a polyoxyalkylene group-containing polyurethane, and then dissolving or emulsifying the polyurethane in water. Preferred are (1) polyurethane having a neutralized carboxyl group in its backbone chain, (2) polyurethane having a mono- or divalent aliphatic hydrocarbon group having 50 to 1,000 carbon atoms; and (3) composite resins composed of a polyurethane resin and a polymer of vinyl monomer.

The vinyl polymers are suitably produced from compounds having in its molecule at least one unsaturated bond capable of radical polymerization or radical copolymerization, for example, from one or more monomers including styrene monomers such as styrene, α-methylstyrene, vinyltoluene, hydroxystyrene, and p-styrenesulfonic acid inclusive of its sodium salt and potassium salts; (meth)acrylonitrile; vinyl ester monomers such as vinyl acetate and vinyl pivalate; (meth)acrylic ester monomers such as methyl (meth)acrylate, ethyl(meth)acrylate, butyl(meth)acrylate, dodecyl (meth)acrylate, 2-ethylhexyl(meth)acrylate and 2-hydroxyethyl (meth)acrylate; (meth)acrylamide; N-vinyl-2-pyrrolidone; diene monomers such as 1,3-butadiene, isoprene, chloroprene and 1,5-hexadiene; maleic monomers such as maleic acid, diethyl maleate and di-n-butyl maleate; fumaric monomers such as fumaric acid and di-n-butyl fumarate; vinyl chloride; and vinylidene chloride. Preferred are vinyl polymers produced from styrene monomers, vinyl ester monomers and (meth)acrylic ester monomers. Also usable as the vinyl polymer include aqueous dispersions of vinyl polymers which are marketed as aqueous emulsion-type adhesives, for example, acrylic aqueous emulsion adhesives using acrylic esters as the main vinyl monomer, vinyl acetate aqueous emulsion adhesives using vinyl acetate as the main vinyl monomer, and styrene aqueous emulsion adhesives using styrene as the main vinyl monomer.

The aqueous dispersion may further contain a thickening agent, a defoaming agent, etc., if required. Examples of the thickening agent include water-soluble polymers such as carboxymethylcellulose, methylcellulose, sodium polyphosphate, polyvinyl alcohol, sodium polyacrylate, casein, vinyl alcohol-methacrylic acid copolymer, starch, dextrin and proteins.

Further, in order to improve the wettability of substrates, a small amount of an organic solvent may be added to the aqueous dispersion. Examples of the organic solvent include hydrocarbons such as pentane, hexane, octane, cyclohexane, benzene, toluene and xylene; alcohols such as ethanol and isopropyl alcohol; esters such as ethyl acetate; ketones such as acetone and methyl ethyl ketone; and ethers such as tetrahydrofuran and dioxane.

Further, the aqueous dispersion may also contain, if required, stabilizers such as antioxidants, weathering stabilizers, thermal decomposition inhibitors, ultraviolet light absorbers; colorants such as titanium oxide and organic pigments; conductivity modifiers such as carbon black and ferrite; and organic or inorganic fillers.

Examples of the antioxidants include 2,6-di-t-butyl-p-cresol, o-t-butyl-p-cresol, tetrakis-[methylene-3-(3,5-di-t-butyl-4-hydroxyphenyl)propionate]methane, β-naphthylamine and p-phenylene diamine.

Examples of the ultraviolet light absorbers include 2,4-dihydroxybenzophenone, 2-(2'-dihydroxy-3',5'-di-t-butylphenyl)-5-chlorobenzotriazole, 2-(2-hydroxy-3-t-butyl-5-methylphenyl)-5-chlorobenzotriazole and bis(2,2',6,6')-tetramethyl-4-piperidine) sebacate.

Examples of the organic fillers include wood powder, pulp powder, and particles of polymers such as rayon, vinylon, polyamides, polyamideimides, polyimides and polytetrafluoroethylene. Examples of the inorganic fillers include silicates such as talc, clay, kaolin and mica; oxides such as silica, titanium oxide, iron oxide and zinc oxide; hydroxides such as aluminum hydroxide and magnesium hydroxide; carbonates such as calcium carbonate and magnesium carbonate; and sulfates such as barium sulfate and calcium sulfate.

The concentration of the aqueous dispersion is not critical, and is preferably controlled so as to provide a viscosity suitable for application to the substrates. The concentration of the block copolymer (I) and the block copolymer (II) is preferably from about 1 to about 50% by weight in total.

The aqueous dispersion is excellent in the bonding and adhesion properties to substrates made of non-polar materials such as polyolefin resins, in particular, substrates made of polypropylene, and also excellent in the bonding and adhesion properties to substrates made of polar materials. Therefore, the aqueous dispersion is useful as coating materials such as primers for use in coating and bonding operations, paints, adhesives and surface modifiers.

For example, the aqueous dispersion is suitable as the coating materials for molded articles made of polyolefins such as high-pressure polyethylene, medium-low-pressure polyethylene, polypropylene, poly-4-methylpentene and polystyrene; and polyolefin copolymers such as ethylene-propylene copolymers, ethylene-butene copolymers, propylene-butene copolymers and ethylene-propylene-diene terpolymers.

The aqueous dispersion is also used for surface-treating, in addition to the molded articles made of polyolefins or other polymers mentioned above, molded articles made of polypropylene and a synthetic rubber, molded articles made of polyamide resin, unsaturated polyester resin, polybutylene terephthalate resin or polycarbonate resin, as well as, steel plates and electro-deposited steel plates. By forming a primer coat of the aqueous dispersion on a surface, the adhesion between the surface and paints, adhesives, etc. each mainly made of polyurethane resin, fatty acid-modified polyester resin, oil-free polyester resin, melamine resin or epoxy resin can be improved. The aqueous dispersion is also used to form coating films excellent in visibility and impact strength at low-temperatures.

Since the coating film to be formed is enhanced in flexibility, the aqueous dispersion is useful in applying, in particular, to substrates exposed to vibration or flexible substrates.

Specifically, the aqueous dispersion is suitable as a primer for improving the adhesion of paints, adhesives, etc. to the surfaces of molded articles exposed to vibration, such as automotive bumpers made of polyolefin such as polypropylene or made of polypropylene and a synthetic rubber. The aqueous dispersion is also suitable as a primer for improving the adhesion of paints, adhesives, etc. to surfaces of soft substrates or substrates to be repeatedly bent such as films, sheets and tubes each made of polyolefin, polyolefin fibers and woven or nonwoven fabrics made of polyolefin fibers.

The aqueous dispersion is applied to the surface of substrates by known methods, preferably by a spray coating, for example, by spaying the aqueous dispersion onto the surface of substrates with a spray gun. The application to woven or nonwoven fabrics is performed by gravure coating or dipping. The application to substrates is conducted at room temperature, and the applied aqueous dispersion is dried by a suitable method such as air drying and force-drying under heating to form coating films.

After applying the aqueous dispersion to the surface of substrates and then drying as described above, the surface of substrates may be coated with paints, adhesives, etc. by electrostatic painting, spray painting, brush painting, etc. The kinds of paints and adhesives are not limited. The aqueous dispersion is preferably used to form a primer on molded articles, which primer is highly adhesive to paints such as solvent-type thermoplastic acrylic resin paints, solvent-type thermosetting acrylic resin paints, acryl-modified alkyd resin paints, epoxy resin paints, polyurethane resin paints, and melamine resin paints. The applied paints, adhesives, etc. are cured by known heating methods using nichrome wire heater, infrared heater or high-frequency heater, to form a desired coating film on substrates. The method for curing the coating film depends upon materials and shapes of molded articles, properties of paints or adhesives used, etc.

The aqueous dispersion is also useful as coating materials (water-proofing agent, mold release agent, heat sealing aid, adhesive for laminating different materials, ink, etc.) for articles with various shapes, which are made of paper, wood, metal, plastics, etc., such as molded articles, films, sheets, fibers, woven fabrics and nonwoven fabrics; modifiers for aqueous paints or aqueous inks which improve dispersion of pigments, gloss, abrasion resistance, water resistance, etc.; binders for ink-jet printing inks or color copying; modifiers for toners; lustering agents; and surface-treating agents for metals.

EXAMPLES

The present invention will be described in more detail by reference to the following examples, but it should be noted that these examples are only illustrative and not intended to limit the scope of the present invention thereto.

In the following examples and comparative examples, properties of coating films produced from aqueous dispersions such as strength, elongation and adhesion properties were measured by the following methods.

A. Strength and Elongation

An aqueous dispersion was applied onto a sheet made of Teflon (registered trademark) and dried at room temperature for 24 h and further at 80° C. under reduced pressure for 24 h. The resultant coating film was peeled off from the Teflon sheet, to obtain a 0.5 mm-thick film. The film was cut into a size of 5 mm in width and 20 mm in length, and pulled at room temperature at a rate of 50 mm/min in the length-wise direction to measure the breaking strength and the elongation at break using "Autograph" (tradename) available from Shimadzu Corporation.

B. Adhesion Properties (Interlaminar Adhesion Strength)

A 1 mm-thick plate made of polypropylene ("Sun-Allomer PC412A" (tradename) manufactured by Japan Polyolefins Co., Ltd.) was washed with isopropyl alcohol, spray-coated with an aqueous dispersion in a dry thickness of 10 μm, dried at 50° C. for 30 min, and then annealed at 80° C. for 15 min. After overlaying the following cover film on the formed coating film, the plate was heated in a dryer at 120° C. for 35 min, subjected to a pressure of 0.98 MPa, and cooled to room temperature under the same pressure, to produce a laminate. The peel strength (g/10 mm) between the polypropylene plate and the coating film prepared from the aqueous dispersion was measured by a 180° peel test (peeling speed: 50 mm/min) at 23° C. and 65% RH using a tensile tester ("Autograph" (tradename) manufactured by Shimadzu Corporation).

Cover Film: 0.1 mm-thick film prepared by press-molding a styrene elastomer ("Hybrar" (tradename) manufactured by Kuraray Co., Ltd.).

C. Adhesion Properties (After Vibration)

A 1 mm-thick plate made of polypropylene ("Sun-Allomer PC412A" (tradename) manufactured by Japan Polyolefins Co., Ltd.) was washed with isopropyl alcohol, spray-coated with an aqueous dispersion in a dry thickness of 10 μm, dried at 50° C. for 30 min, and then annealed at 80° C. for 15 min. A two-pack urethane topcoat paint (a blend of 10 parts by weight of "Retan PG80" (tradename) and one part by weight of "Retan Curing Agent" (tradename) manufactured by Kansai Paint Co., Ltd.) was applied onto the resultant coating film in a coating thickness of 50 μm, dried at 50° C. for one hour and then annealed at 100° C., to prepare a painted plate.

Next, 100 cross cuts were formed on the cured coating film of the painted plate by cutting with a cutter at 1-mm intervals. Using an ultrasonic washing machine (tradename "Bransonic 2510J-DTH" manufactured by Branson Ultrasonic Corporation), the plate was then exposed to ultrasonic waves for 3 min with the plate immersed in water. After removing water on the surface of the plate, a strip of cellophane adhesive tape was applied onto the 100 cross cuts. Then, the adhesive tape was rapidly peeled off at an angle of 90°. The number of cross cuts remained not peeled was counted to evaluate the adhesion properties. The same peel test was repeated while omitting the exposure to ultrasonic waves and the number of cross cuts remained not peeled was counted.

Production Example 1

Production of Aqueous Dispersion (I-1) of Block Copolymer (I-1) Composed of Propylene-α-Olefin Copolymer Block/ethyl Acrylate-Acrylic Acid Copolymer Block (1) Into a 1-L reactor, 500 g of a propylene-α-olefin copolymer ("Tafmer XR110T" (tradename) manufactured by Mitsui Chemicals, Inc.) was introduced, which was then stirred for 2 h after the inner temperature was raised up to 390° C., to obtain a double bond-terminated propylene-α-olefin copolymer. The content of the terminal double bond was 188.7 μmol/g.

(2) Into a reactor, were charged 100 parts by weight of the double bond-terminated propylene-α-olefin copolymer produced in the step (1), 300 parts by weight of xylene and 4.3 parts by weight of thio-S-acetic acid. After fully replacing the inner atmosphere with nitrogen, 0.1 part by weight of 2,2'-azobisisobutyronitrile was added. The reaction was allowed to proceed at 90° C. for 2 h, to produce a thioacetyl-terminated propylene-α-olefin copolymer. The content of the terminal thioacetyl group was 179.2 μmol/g and the degree of addition was 95%.

(3) Into a mixed solvent of 120 parts by weight of xylene and 30 parts by weight of n-butanol, 100 parts by weight of the thioacetyl-terminated propylene-α-olefin copolymer produced in the step (2) was dissolved. After adding 5.7 parts by weight of a 4% solution of sodium hydroxide in n-butanol to the solution, the reaction was allowed to proceed for one hour at the toluene refluxing temperature, to produce a mercapto-terminated propylene-α-olefin copolymer. The content of the terminal mercapto group was 175.6 μmol/g, and the degree of reaction was 98%.

(4) Into 150 parts by weight of xylene, 100 parts by weight of the mercapto-terminated propylene-α-olefin copolymer produced in the step (3) was dissolved. After adding 90 parts by weight of ethyl acrylate and 10 parts by weight of acrylic acid to the solution, 1,1'-azobis(cyclohexane-1-carbonitrile) was further added in a nitrogen atmosphere at 90° C. in an amount such that the rate of polymerization was about 10% per hour. The reaction was stopped at the time when the degree of polymerization reached 95%. By removing the solvent in a vacuum dryer, a diblock copolymer (I-1) (hereinafter referred to merely as "block copolymer (I-1)") composed of a propylene-α-olefin copolymer block (A1) and an ethyl acrylate-acrylic acid copolymer block (B1) (ethyl acrylate:acrylic acid=90:10 by weight) was obtained. The number-average molecular weight was 5,300 for the polymer block (A1), 4,500 for the polymer block (B1), and 9,800 for the block copolymer (I-1). The melting point of the block copolymer (I-1) was 103° C.

(5) In a 0.5-L reactor equipped with a stirrer and a condenser, 50 g of the block copolymer (I-1) was dissolved in 250 g of xylene at 100° C. Then, 300 g of a 0.1% aqueous solution of sodium hydroxide was added to the solution from a dropping funnel over one hour, to prepare a xylene-water suspension. By removing xylene in the suspension by distillation, a crude aqueous emulsion was obtained. Into a pressure reaction vessel, 300 g of the crude aqueous emulsion (resin content: 50 g) and 3.9 g of 28% ammonia water were charged, and the contents was stirred at 160° C. for one hour. After stirring, the mixture was cooled to room temperature to obtain an aqueous dispersion (I-1). The dispersed matter in the aqueous dispersion (I-1) was spherical, having an average particle size of 0.3 μm. The aqueous dispersion (I-1) was kept stable without change in the particle size even after allowed to stand for one week.

Production Example 2 roduction of Aqueous Dispersion (I-2) of Block Copolymer (I-2) Composed of Propylene-α-Olefin Copolymer Block/Tetrahydrofurfuryl Acrylate-Acrylic Acid Copolymer Block Into 150 parts by weight of xylene, 100 parts by weight of the mercapto-terminated propylene-α-olefin copolymer produced in the step (3) of Production Example 1 was dissolved. After adding 90 parts by weight of tetrahydrofurfuryl acrylate and 10 parts by weight of acrylic acid to the solution, 1,1'-azobis(cyclohexane-1-carbonitrile) was further added in a nitrogen atmosphere at 90° C. in an amount such that the rate of polymerization was about 10% per hour. The reaction was stopped at the time when the degree of polymerization reached 95%. By removing the solvent in a vacuum dryer, a diblock copolymer (hereinafter referred to merely as "block copolymer (I-2)") composed of a propylene-α-olefin copolymer block (A2) and an tetrahydrofurfuryl acrylate-acrylic acid copolymer block (B2) (tetrahydrofurfuryl acrylate:acrylic acid=90:10 by weight) was obtained. The number-average molecular weight was 5,300 for the polymer block (A2), 4,500 for the polymer block (B2), and 9,800 for the block copolymer (I-2). The melting point of the block copolymer (I-2) was 103° C.

In a 0.5-L reactor equipped with a stirrer and a condenser, 50 g of the block copolymer (I-2) was dissolved in 250 g of xylene at 100° C. Then, 300 g of a 0.1% aqueous solution of sodium hydroxide was added to the solution through a dropping funnel over one hour, to prepare a xylene-water suspension. By removing xylene in the suspension by distillation, a crude aqueous emulsion was obtained. Into a pressure reaction vessel, 300 g of the crude aqueous emulsion (resin content: 50 g) and 3.9 g of 28% ammonia water were charged, and the contents were stirred at 160° C. for one hour. After stirring, the mixture was cooled to room temperature to obtain an aqueous dispersion (I-2). The dispersed matter in the aqueous dispersion (I-2) was spherical, having an average particle size of 0.3 μm. The aqueous dispersion (I-2) was kept stable without change in the particle size even after allowed to stand for one week.

Production Example 3

Production of Aqueous Dispersion (II-1) of Block Copolymer (II-1) (Hydrogenated Styrene-Isoprene-Styrene Triblock Copolymer)

(1) The polymerization was conducted in cyclohexane by successively introducing styrene, isoprene and styrene into a reactor in this order in the presence of an n-butyllithium polymerization catalyst and tetrahydrofuran, to produce a styrene-isoprene-styrene triblock copolymer. The block copolymer thus produced was hydrogenated in cyclohexane in the presence of a Ziegler hydrogenation catalyst under a hydrogen pressure of 1.96 MPa (20 kg/cm$^2$), to produce the titled hydrogenated triblock copolymer (hereinafter referred to merely as "block copolymer (II-1)").

The number-average molecular weight (Mn) was 120,000 for the block copolymer (II-1), 8,000 for each styrene block, and 104,000 for the hydrogenated polyisoprene block; the degree of hydrogenation of the hydrogenated polyisoprene block was 92%; and the content of 1,2-bond and 3,4-bond in the hydrogenated polyisoprene block was 45 mol % in total, when determined by gel permeation chromatography (GPC), $^1$H-NMR analysis and iodine value measurement.

(2) An aqueous dispersion was prepared from the block copolymer (II-1) according to the method described in Examples of JP 11-117180A. Namely, 100 g of the block copolymer (II-1) was dissolved in 400 g of cyclohexane. After adding 10 g of a nonionic surfactant "Nonipol 40" (tradename, polyethylene glycol-type nonionic surfactant manufactured by Sanyo Chemical Industries, Ltd.) and 400 g of distilled water, the solution was stirred with a homomixer, to prepare a uniform dispersion. The dispersion was distilled in a reaction vessel equipped with a stirrer and a condenser to remove cyclohexane, to obtain an aqueous dispersion (II-1). The dispersed matter in the aqueous dispersion (II-1) was spherical, having an average particle size of 0.3 μm.

Production Example 4

Production of Aqueous Dispersion (II-2) of Block Copolymer (II-2) (Hydrogenated Styrene-Isoprene-Styrene Triblock Copolymer)

(1) The polymerization was conducted in cyclohexane by successively introducing styrene, isoprene and styrene into a reactor in this order in the presence of an n-butyllithium polymerization catalyst, to produce a styrene-isoprene-styrene triblock copolymer. The block copolymer thus produced was hydrogenated in cyclohexane in the presence of a Ziegler hydrogenation catalyst under a hydrogen pressure of 1.96 MPa (20 kg/cm$^2$), to produce the titled hydrogenated triblock copolymer (hereinafter referred to merely as "block copolymer (II-2)").

The number-average molecular weight (Mn) was 50,000 for the block copolymer (II-2), 7,500 for each styrene block, and 35,000 for the hydrogenated polyisoprene block; the degree of hydrogenation of the hydrogenated polyisoprene block was 98%; and the content of 1,2-bond and 3,4-bond in the hydrogenated polyisoprene block was 10 mol % in total, when determined by gel permeation chromatography (GPC), $^1$H-NMR analysis and iodine value measurement.

(2) In the same manner as in the step (2) of Production Example 3 except for using the block copolymer (II-2) in place of the block copolymer (II-1), an aqueous dispersion (II-2) of the block copolymer (II-2) was prepared. The dispersed matter in the aqueous dispersion (II-2) was spherical, having an average particle size of 0.3 μm.

Examples 1-3

An aqueous dispersion was prepared by mixing the aqueous dispersion (I-1) and the aqueous dispersion (II-1) in amounts such that the weight ratio of the block copolymer (I-1) and the block copolymer (II-1) was as shown in Table 1. The coating film produced from the prepared aqueous dispersion was measured for its properties (breaking strength, elongation at break and interlaminar adhesion strength) by the methods mentioned above. The results are shown in Table 2. Separately, a painted plate that was produced by the method mentioned above by using the aqueous dispersion obtained in Example 2 was evaluated for its adhesion properties (after vibration). The entire 100 cross cuts remained not peeled in both the cases where the exposure to ultrasonic waves was performed for zero minute (no exposure) and for 3 min.

Examples 4-5

An aqueous dispersion was prepared by mixing the aqueous dispersion (I-1), the aqueous dispersion (II-1) and an emulsion of a tackifier ("Super Ester E-720" (tradename) manufactured by Arakawa Chemical Industries, Ltd.) in amounts such that the weight ratio of solid components was as shown in Table 1. The coating film produced from the prepared aqueous dispersion was measured for its properties (breaking strength and elongation at break) by the methods mentioned above. The results are shown in Table 3.

Example 6

An aqueous dispersion was prepared by mixing the aqueous dispersion (I-2) and the aqueous dispersion (II-1) in amounts such that the weight ratio of the block copolymer (I-2) and the block copolymer (II-1) was as shown in Table 1. The coating film produced from the prepared aqueous dispersion was measured for its properties (breaking strength and elongation at break) by the methods mentioned above. The results are shown in Table 3.

Example 7

An aqueous dispersion was prepared by mixing the aqueous dispersion (I-2) and the aqueous dispersion (II-2) in amounts such that the weight ratio of the block copolymer (I-2) and the block copolymer (II-2) was as shown in Table 1. The coating film produced from the prepared aqueous dispersion was measured for its properties (breaking strength and elongation at break) by the methods mentioned above. The results are shown in Table 3.

Comparative Examples 1-2

The coating film produced from only one of the aqueous dispersion (I-1) and the aqueous dispersion (I-2) was measured for its properties (breaking strength and elongation at break) by the methods mentioned above. The results are shown in Table 3. Separately, a painted plate that was produced by the method mentioned above by using the aqueous dispersion (I-1) was evaluated for its adhesion properties (after vibration). Although the entire 100 cross cuts remained not peeled when not exposed to ultrasonic waves (exposed for zero minute), 50 cross cuts were peeled off when exposed to ultrasonic waves for 3 min.

TABLE 1

| | Ingredients of aqueous dispersion (weight parts*) | | | | |
|---|---|---|---|---|---|
| | block copolymer (I) | | block copolymer (II) | | |
| | I-1 | I-2 | II-1 | II-2 | tackifier |
| Examples | | | | | |
| 1 | 70 | — | 30 | — | — |
| 2 | 50 | — | 50 | — | — |
| 3 | 30 | — | 70 | — | — |
| 4 | 66.5 | — | 28.5 | — | 5 |
| 5 | 21 | — | 49 | — | 30 |
| 6 | — | 30 | 70 | — | — |
| 7 | — | 30 | — | 70 | — |
| Comparative Examples | | | | | |
| 1 | 100 | — | — | — | — |
| 2 | — | 100 | — | — | — |

*Weights of solid components in aqueous dispersion.

TABLE 2

| | Properties of coating film | | |
|---|---|---|---|
| Examples | breaking strength (kg/mm$^2$) | elongation at break (%) | interlaminar adhesion strength (g/10 mm) |
| 1 | 0.18 | 1290 | 500 |
| 2 | 0.24 | 1500 | 300 |
| 3 | 0.40 | 1010 | 250 |

TABLE 3

| | Properties of coating film | |
|---|---|---|
| | breaking strength (kg/mm$^2$) | elongation at break (%) |
| Examples | | |
| 4 | 0.16 | 1260 |
| 5 | 0.49 | 630 |
| 6 | 0.52 | 870 |
| 7 | 1.27 | 580 |
| Comparative Examples | | |
| 1 | 0.14 | 160 |
| 2 | 0.17 | 50 |

Upon comparing Examples 1 to 3 with Comparative Example 1, and Examples 6 and 7 with Comparative Example 2, it would appear that the aqueous dispersions containing the block copolymer (II) provide coating films having an excellent flexibility.

Upon comparing the evaluation results of adhesion properties (after vibration) of Example 2 and Comparative Example 1, it would appear that the aqueous dispersion containing the block copolymer (II) provides a coating film excellent in the adhesion strength to the polypropylene plate even after the application of vibration.

Example 8

An aqueous dispersion was prepared by mixing the aqueous dispersion (I-1) and the aqueous dispersion (II-2) in amounts such that the weight ratio of the block copolymer (I-1) and the block copolymer (II-2) was 50/50.

The interlaminar adhesion strength of the coating film produced from the prepared aqueous dispersion was 175 g/10 mm when measured by the method described above.

Example 9

An entangled nonwoven fabric of polypropylene fibers (basis weight: 17 g/m$^2$) was impregnated with the aqueous dispersion produced in Example 1 and dried, to prepare a fibrous substrate having a basis weight of 32 g/m$^2$ (entangled nonwoven fabric:block copolymers (I) and (II)=53:47 by weight).

A stack of the fibrous substrates were laminated using a laminator at 120° C. at a speed of 1000 mm/min to produce a laminated sheet. When the fibrous substrates were pulled toward opposite directions for peeling, the nonwoven fabrics were structurally broken.

Example 10

The aqueous dispersion produced in Example 1 was spray-coated on the surface (not corona-treated) of a polypropylene film ("OPM-1" (tradename) manufactured by Tohcello Co., Ltd.) in a dry thickness of 25 μm, dried at 50° C. for 20 min, and then annealed at 80° C. for 15 min.

An entangled nonwoven fabric of polyester fibers (basis weight: 60 g/cm$^2$) was stacked on the resultant coating film. The stack was made into a laminated sheet using a laminator under the conditions of 120° C. and a speed of 1000 mm/min. When the polypropylene film and the nonwoven fabric were pulled toward opposite directions for peeling, the nonwoven fabric was structurally broken.

INDUSTRIAL APPLICABILITY

In accordance with the present invention, an aqueous dispersion capable of forming a flexible coating film which is excellent in bonding and adhesion properties to various substrates is provided. The aqueous dispersion is useful as a coating material for substrates, in particular, substrates subjected to vibration and flexible substrates. The aqueous dispersion is also applicable to substrates made of a non-polar material, in particular, substrates made mainly of polypropylene.

The entire content of JP 2003-44573 filed in Japan from which this application claims priority is incorporated herein by reference, and the contents of any documents including patents and patent applications which are referred to herein are also incorporated by reference in their entirety.

What is claimed is:

1. An aqueous dispersion which is produced by incorporating a block copolymer (II) into an aqueous dispersion (I) of a block copolymer (I) in an aqueous solution containing a basic compound, wherein:
    the block copolymer (I) is a diblock copolymer composed of a polymer block (A) mainly constituted by a constitutional unit derived from an olefin monomer and a polymer block (B) constituted by a constitutional unit derived from a vinyl monomer (b1) having a carboxyl group, a carboxylic anhydride group or a sulfonic group and a constitutional unit derived from another vinyl monomer (b2) copolymerizable with the vinyl monomer (b1);
    the olefin monomer comprises at least one monomer selected from the group consisting of ethylene, α-olefins, 2-butene, isobutylene, conjugated dienes, vinylcyclohexane and β-pinene;
    when the olefin monomer comprises a conjugated diene, the polymer block (A) is a block in which the unsaturated bonds of the constitutional units derived from conjugated dienes are hydrogenated;
    a content of the basic compound is 0.05 equiv or more of the carboxyl group, carboxylic anhydride group or sulfonic group contained in the unit derived from the vinyl monomer (b1); and
    the block copolymer (II) is composed of a polymer block (X) mainly constituted by a constitutional unit derived from an aromatic vinyl monomer and a polymer block (Y) constituted by a constitutional unit derived from a conjugated diene monomer.

2. The aqueous dispersion according to claim 1, wherein a weight ratio of the block copolymer (I) to the block copolymer (II) is from 10:90 to 90:10.

3. The aqueous dispersion according to claim 1, wherein the polymer block (A) is derived from polyethylene, polypropylene, propyleneethylene copolymer, propylene-α-olefin copolymer or ethylene-α-olefin copolymer.

4. The aqueous dispersion according to claim 1, wherein the polymer block (A) has a number-average molecular weight of from 500 to 100,000, and the polymer block (B) has a number-average molecular weight of from 500 to 100,000.

5. The aqueous dispersion according to claim 1, wherein the constitutional unit of the polymer block (Y) comprises a unit derived from isoprene, butadiene or a mixture of isoprene and butadiene.

6. The aqueous dispersion according to claim 1, wherein a content of 1,2-bond and 3,4-bond in the polymer block (Y) is 30 mol % or more in total.

7. The aqueous dispersion according to claim 1, further comprising a tackifier.

8. A coated substrate obtained by applying the aqueous dispersion of claim 1 to a substrate.

9. A method of priming a surface of a substrate, comprising applying the aqueous dispersion of claim 1 to the surface of the substrate.

10. A method of adhering two substrates comprising applying the aqueous dispersion of claim 1 to a first substrate; and contacting the applied dispersion with a second substrate.

11. The aqueous dispersion according to claim 2, wherein the polymer block (A) is derived from polyethylene, polypropylene, propylene-ethylene copolymer, propylene-α-olefin copolymer or ethylene-α-olefin copolymer.

12. The aqueous dispersion according to claim 2, wherein the polymer block (A) has a number-average molecular weight of from 500 to 100,000, and the polymer block (B) has a number-average molecular weight of from 500 to 100,000.

13. The aqueous dispersion according to claim 3, wherein the polymer block (A) has a number-average molecular weight of from 500 to 100,000, and the polymer block (B) has a number-average molecular weight of from 500 to 100,000.

14. The aqueous dispersion according to claim 2, wherein the constitutional unit of the polymer block (Y) comprises a unit derived from isoprene, butadiene or a mixture of isoprene and butadiene.

15. The aqueous dispersion according to claim 3, wherein the constitutional unit of the polymer block (Y) comprises a unit derived from isoprene, butadiene or a mixture of isoprene and butadiene.

16. The aqueous dispersion according to claim 4, wherein the constitutional unit of the polymer block (Y) comprises a unit derived from isoprene, butadiene or a mixture of isoprene and butadiene.

17. The aqueous dispersion according to claim 2, wherein a content of 1,2-bond and 3,4-bond in the polymer block (Y) is 30 mol % or more in total.

18. The aqueous dispersion according to claim 3, wherein a content of 1,2-bond and 3,4-bond in the polymer block (Y) is 30 mol % or more in total.

19. The aqueous dispersion according to claim 4, wherein a content of 1,2-bond and 3,4-bond in the polymer block (Y) is 30 mol % or more in total.

20. The aqueous dispersion according to claim 5, wherein a content of 1,2-bond and 3,4-bond in the polymer block (Y) is 30 mol % or more in total.

21. The aqueous dispersion according to claim 1, wherein the block copolymer (II) is a triblock copolymer of the formula X-Y-X, where X is the polymer block (X) and Y is the polymer block (Y).

* * * * *